United States Patent [19]

Isowa et al.

[11] 3,901,890

[45] Aug. 26, 1975

[54] PROCESS FOR PRODUCTION OF DIKETOPIPERAZINE DIHYDROXAMATES AND INTERMEDIATES THEREFOR

[75] Inventors: Yoshikazu Isowa, Tokyo; Toshiyuki Takashima, Ebina; Muneki Ohmori, Sagamihara; Hideaki Kurita, Sagamihara; Masanari Sato, Sagamihara; Kaoru Mori, Sagamihara, all of Japan

[73] Assignee: Sagami Chemical Research Center, Tokyo, Japan

[22] Filed: Aug. 2, 1973

[21] Appl. No.: 384,847

Related U.S. Application Data

[62] Division of Ser. No. 239,349, March 29, 1972, Pat. No. 3,772,265.

[30] Foreign Application Priority Data

Mar. 30, 1971 Japan ............................... 46-18373

Apr. 9, 1971 Japan ............................... 46-21781

May 20, 1971 Japan ............................... 46-33620

[52] U.S. Cl..... 260/268 DK; 260/112.5; 260/471 C; 260/471 A
[51] Int. Cl.$^2$ ..................................... C07D 295/00
[58] Field of Search .......... 260/268, 453 RW, 112.5

*Primary Examiner*—Donald G. Daus
*Assistant Examiner*—Jose Tovar
*Attorney, Agent, or Firm*—Sughrue, Rothwell, Mion, Zinn and Macpeak

[57] ABSTRACT

A process for the production of diketopiperazine dihydroxamates which are useful in the biological field and intermediates for the synthesis of said diketopiperazine dihydroxamates is disclosed.

7 Claims, No Drawings

PROCESS FOR PRODUCTION OF DIKETOPIPERAZINE DIHYDROXAMATES AND INTERMEDIATES THEREFOR

This is a division of application Ser. No. 239,349, filed March 29, 1972, now U.S. Pat. 3,772,265.

This invention relates to a process for the production of piperazine derivatives. More particularly, it relates to a process for the production of cyclo-di-N$^\delta$-acetyl-N$^\delta$-hydroxy-L-ornithyl, i.e., diketopiperazine dihydroxamates, and the novel intermediates for the synthesis of diketopiperazine dihydroxamates and a process for the production of such intermediates.

The diketopiperazine dihydroxamates prepared in accordance with the process of this invention are represented by the following formula

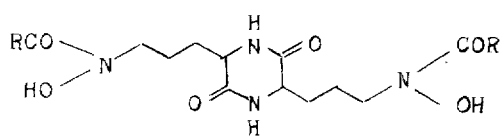

wherein $R$ represents a lower alkyl group having 1 to 4 carbon atoms, inclusive. The synthesis of compounds of this type has not been reported in literature, and it was confirmed that this type of compound exists only in the natural field. For example, rhodotorulic acid which is included in the product of this invention (R=methyl) was reported by C. L. Atkin, et al., "Biochemistry", 7, No. 10, 3734 (1968) in which rhodotorulic acid was isolated from the fermentation broth of a red yeast identified as *Rhodotorula pilimanae* and the structural formula of rhodotorulic acid was determined as cyclo-di-N$^\delta$-acetyl-N$^\delta$-hydroxy-L-ornithyl. It was also reported in "Biochemistry", 7, No. 10, 3734 (1968) that rhodotorulic acid exhibits a biological activity comparable to that of schizokinen in Lankford's Bacillus system and that it also exhibits an activity as a growth factor in the assay using Arthrobacter species. Thus, rhodotorulic acid is an extremely useful compound in the biological field and the success in synthesis of rhodotorulic acid is of significant importance in industry.

This invention also contemplates certain novel peptides which are useful not only as intermediates for the synthesis of cyclo-di-N$^\delta$-acetyl-N$^\delta$-hydroxyornithyl, but also are biologically active. Peptides isolated from the metabolites of microorganisms frequently contain, as their components, ω-hydroxyamino-α-aminoacids, and therefore the novel amino acid derivatives represented by the formula III below are expected to be useful compounds for various purposes such as the synthesis of a wide variety of biologically active compounds.

The object of this invention is therefore to provide a process for the production of diketopiperazine hydroxamate derivatives.

Another object of this invention is to provide novel intermediates for the synthesis of diketopiperazine hydroxamate derivatives and a process for the production of such intermediates.

The process according to the present invention can be illustrated by the following reaction scheme:

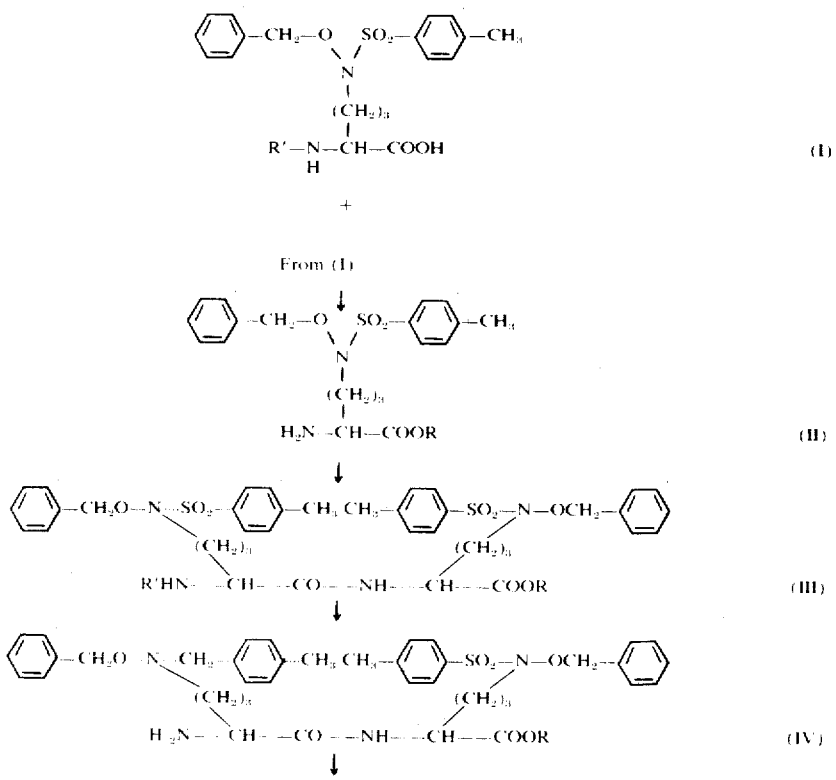

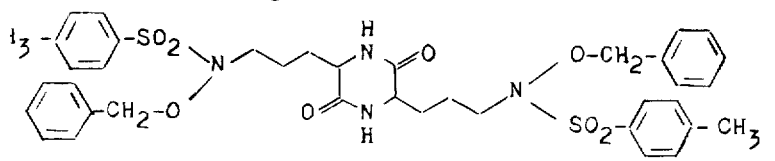

(V)

From (V)

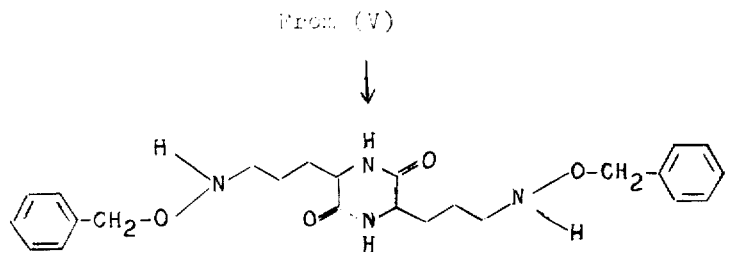

(VI)

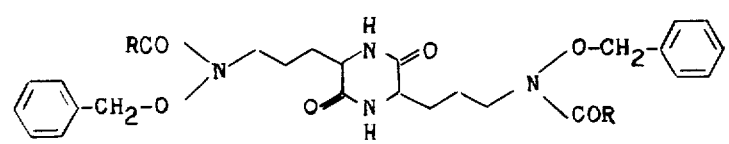

(VII)

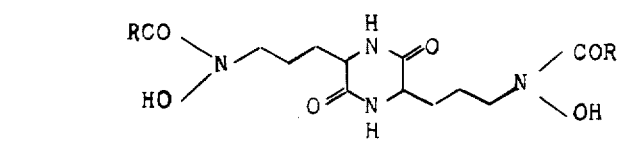

(VIII)

herein R' represents a protecting group as defined hereinafter, and R is a lower alkyl group having 1 to 4 carbon atoms, inclusive.

The starting materials of the process of this invention, N⁵-tosyl-N⁸-benzyloxy-L-ornithine having the formula I and N⁵-tosyl-N⁸-benzyloxy-L-ornithine alkyl ester having the formula II, can be derived from -(N-tosyl-N-benzyloxy)-ornithine which is, in turn, obtainable by hydrolysis of the α-acylamino-ω-(O,N-substituted-hydroxy)-alkylmalonic acid ester disclosed in Japanese Pat. No. 24763/1970 proposed by the present inventors. More specifically, the starting material having the formula I can be produced by first subjecting the above N⁵-tosyl-N⁸-benzyloxy-DL-ornithine to optical resolution to obtain the corresponding L-amino acid and then protecting the α-amino group of the L-amino acid with a protecting group. The term "protecting group" used herein means any one of the conventional protecting groups for the amino group commonly employed in the art of peptide synthesis and includes, for example, carbobenzoyl group, a t-butoxycarbonyl group, a p-methoxybenzyloxycarbonyl group and the like. Another starting material having the formula II (a lower alkyl ester) can easily be produced from the above L-amino acid by the conventional ester formation technique, for example, by suspending the L-amino acid in an appropriate alcohol and passing hydrogen chloride gas into the resulting alcoholic suspension.

The reaction between the starting materials (I and II) can be accomplished by coupling the materials in an approximately molar equivalent in accordance with the acid anhydride method or the isoxazoline method in a solvent such as tetrahydrofuran, nitromethane or the like, at a temperature in the range of from −5°C to 10°C thereby yielding an L-hydroxyornithine dipeptide derivative represented by the formula III. The subsequent removal of the protecting group from the resulting compound (III) can be carried out by any one of the well-known procedures, such as by treating the compound (III) while stirring in an acetic acid solvent in the presence of a hydrogen halide. The acetic acid solvent may preferably be acetic acid per se or an acetate ester. The removal of the protecting group can be conducted at room temperature, i.e., a temperature between about 15°C and 25°C. Under such conditions, the desired dipeptide ester having the formula IV can be obtained in the form of its hydrohalide salt in high purity and high yield. It is to be understood that the above coupling reaction and the removal of protecting group may also be adapted to the corresponding D-form thereby resulting in the production of the desired compound (IV) in the D-form The cyclization of the thus obtained dipeptide ester of the formula IV can then be conducted in an appropriate alcohol using ammonia gas to produce cyclo-di-$N^\delta$-tosyl-$N^\delta$-benzyloxy-ornithyl of the formula V. For example, the cyclication may be carried out by adding the dipeptide ester in the form of its hydrohalide salt to methanol which has previously been saturated with anhydrous ammonia and allowing the mixture to stand for several days at a temperature of from about 0°C to room temperature.

The resulting compound (V) is then subjected to detosylation procedure to give a novel compound having the formula (VI), cyclo-di-$N^\delta$-benzyloxy-ornithyl. The detosylation can be effected by treatment of the compound of the formula V in a specific solvent system. The solvent system used in the detosylation step comprises hydrogen bromide, acetic acid and phenol in such a proportion that hydrogen bromide in acetic acid is a solution containing hydrogen bromide in an amount of 30 to 40% by weight, preferably about 36% by weight and that phenol is used in an amount of from 0.1 to 0.3 parts by weight per 1 part by weight of acetic acid. The detosylation can be accomplished by adding the compound (V) to the above hydrogen bromide-acetic acid-phenol solvent system and stirring the mixture at approximately room temperature, generally in the range of from 18°C to 25°C, for at least 30 hours, generally from 30 to 60 hours. At lower temperatures the reaction does not proceed smoothly, while at higher temperatures the desired detosylated compound (VI) tends to decompose. Unduly prolonged stirring also results in the decomposition of the desired compound (VI). After completion of the reaction, the compound (VI) can be isolated as crystals from the reaction mixture by any one of the well-known techniques. It is also to be understood that the detosylation procedure may be adapted to the compound (V) in either D-, L- or DL-form thereby yielding the corresponding optical isomer of cyclo-di-$N^\delta$-benzyloxyornithyl having the formula (VI).

The thus obtained compound (VI) can then be acylated with an acid anhydride of lower aliphatic acids in a basic solvent to give cyclo-di-$N^\delta$-acetyl-$N^\delta$-benzyloxy-ornithyl having the formula VII. The acetylation can easily be conducted by any one of the well-known acylation procedures, and the solvent of choice for the acylation includes quinoline and pyridine. Again, the acylation may be employed for the compound (VI) in either D-, L- or DL-form thereby yielding the corresponding optical isomer of the acylate (VII).

The final step of the process of this invention is debenzylation of the above acylate (VII). This debenzylation can be carried out by catalytic reduction in the presence of a catalyst, for example, palladium-on-carbon, and the like, at normal temperature under normal pressure. The amount of the catalyst is not critical and may be a so-called catalytic amount. The debenzylation is usually completed within about 10 to 20 hours at normal temperature. The desired final product of the formula VIII, cyclo-di-$N^\delta$-acetyl-$N^\delta$-hydroxyornithyl, can be isolated from the reaction mixture in a usual manner and purified by recrystallization, etc. The debenzylation is also employed for the compound (VII) in either D-, L- or DL-form thereby yielding the corresponding optical isomer of the product having the formula VIII.

The present invention is further illustrated by the following examples, but they are not to be construed as limiting the scope of the invention.

Example 1

(A). $N^\alpha$-Benzyloxycarbonyl-$N^\delta$-tosyl-$N^\delta$-benzyloxy-L-ornithyl-$N^\delta$-tosyl-$N^\delta$-benzyloxy-L-ornithine methyl ester 1.26 ml of isobutyl chloroformate was added to a cooled solution of 1.31 ml of triethylamine and 4.90 g of $N^\alpha$-benzyloxycarbonyl-$N^\delta$-tosyl-$N^\delta$-benzyloxy-L-ornithine in 45 ml of tetrahydrofuran at a temperature of from −10° to −15°C. After 20 minutes, to the resulting solution was added a solution of 4.24 g of $N^\delta$-tosyl-$N^\delta$-benzyloxy-L-ornithine methyl ester hydrochloride and 1.31 ml of triethylamine. The mixture was then stirred overnight at room temperature, and evaporated in vacuo. The residue was combined with water, and the mixture was filtered to collect the product. The thus obtained product was dissolved in 50 ml of ethyl acetate, and the solution was washed successively with 1N hydrochloric acid, water, 0.5M aqueous sodium bicarbonate and water and dried over anhydrous sodium sulfate. The solution was then filtered and evaporated in vacuo to dryness to give a product identified as $N^\alpha$-benzyloxycarbonyl-$N^\delta$-tosyl-$N^\delta$-benzyloxy-L-ornithyl-$N^\delta$-tosyl-$N^\delta$-benzyloxy-L-ornithine methyl ester by its N.M.R. and I.R. spectra.

Yield: 8.4 g (98%).

Analysis: Calcd. for $C_{47}H_{54}N_4O_{11}S_2$:

C, 61.70; H, 5.90; N, 6.13

Found: C, 61.59; H, 6.12; N, 6.25.

(B). $N^\delta$ tosyl-$N^\delta$-benzyloxy-L-ornithyl-$N^\delta$-tosyl-benzyloxy-L-ornithine methyl ester hydrobromide 8.2 ml of 36% hydrogen bromide-acetic acid was added to a solution of 8.3 g of $N^\alpha$-benzyloxycarbonyl-$N^\delta$-tosyl-$N^\delta$-benzyloxy-L-ornithyl-$N^\delta$-tosyl-$N^\delta$-benzyloxy-L-ornithine methyl ester obtained in Example 1, (A) in 6.5 ml of acetic acid. After allowing to stand for 90 minutes, the resulting solution was evaporated in vacuo, and the residual oily substance was triturated with ether and repeatedly washed with ether by decantation. The resulting oily substance was identified as $N^\delta$-tosyl-$N^\delta$-benzyloxy-L-ornithyl-$N^\delta$-tosyl-$N^\delta$-benzyloxy-L-ornithine methyl ester hydrobromide by its thin layer chromatography.

Yield: 6.3 g (79%).

Example 2

A.

A). $N^\alpha$-t-Butyloxycarbonyl-$N^\delta$-tosyl-$N^\delta$-benzyloxy-L-ornithyl-N -tosyl-N -benzyloxy-L-ornithine methyl ester 3.82 ml of triethylamine was added to a suspension of 12.26 g of $N^\alpha$-t-butyloxycarbonyl-$N^\delta$-tosyl-$N^\delta$-benzyloxy-L-ornithine and 6.31 g of N-ethyl-5-phenylisoxazolium-3'-sulfonate in 80 ml of nitromethane charged into a sealed glass vessel at a temperature of 0°C. The mixture was stirred in an ice bath until a clear solution was obtained, i.e., for two hours. To the resulting solution was then added 11.30 g of $N^\delta$-tosyl-$N^\delta$-benzyloxy-L-ornithine methyl ester hydrochloride and 3.82 ml of triethylamine at a temperature of 0°C. The reaction mixture was stirred for two hours at 0°C and then overnight at room temperature, and evaporated in vacuo to give an oily substance. The thus obtained residue was extracted with ethyl acetate, and the ethyl acetate extract was washed with water, an aqueous sodium carbonate (three times) and finally water followed by drying over magnesium sulfate. After filtration, the filtrate was evaporated in vacuo, and the oily residue was triturated with petroleum ether. The thus obtained product was purified by dissolving in ethyl acetate and adding petroleum ether to give a purified product identified as $N^\alpha$-t-butyloxycarbonyl-$N^\delta$-tosyl-$N^\delta$-benzyloxy-L-ornithyl-$N^\delta$-tosyl-$N^\delta$-benzyloxy-L-ornithine methyl ester by its N.M.R. and I.R. spectra. Melting point, 63°–69°C; $[\alpha]_D^{24.8}$ +1.1 (C, 1 in ethyl acetate).

Analysis: Calcd. for $C_{44}H_{56}N_4O_{11}S_2$:
C, 59.98; H, 6.41; N, 6.37
Found: C, 60.09; H, 6.65; N, 6.10.

B). $N^\delta$-tosyl-$N^\delta$-benzyloxy L-ornithyl-$N^\delta$-tosyl-$N^\delta$-benzyloxy-L-ornithine methyl ester hydrochloride 80 ml of 3N hydrochloric acid in ethyl acetate was added to a solution of 18.76 g of $N^\alpha$-t-butyloxycarbonyl-$N^\delta$-tosyl-$N^\delta$-benzyloxy-L-ornithyl-$N^\delta$-tosyl-$N^\delta$-benzyloxy-L-ornithine methyl ester obtained in Example 2 (A). The resulting solution was allowed to stand at room temperature for two hours and evaporated in vacuo to give an oily substance which was then triturated with either to crystallize. The thus obtained crystalline product was identified as $N^\delta$-'tosyl-$N^\delta$-benzyloxy-L-ornithyl-$N^\delta$-tosyl-$N^\delta$-benzyloxy-L-ornithine methyl ester hydrochloride by its N.M.R. and I.R. spectra.

Yield: 16.10 g (92.5%). Melting point, 100°–105°C, $[\alpha]_D^{25}$ +12.10 (c, 1 in methanol).

Analysis: Calcd. for $C_{39}H_{49}N_4O_9S_2Cl$:
C, 57.30; H, 6.04; N, 6.85
Found: C, 56.98; H, 6.24; N, 6.58.

Example 3

A.

(A). $N^\alpha$-t-Butyloxycarbonyl-$N^\delta$-tosyl-$N^\delta$-benzyloxy-D-ornithyl-$N^\delta$-tosyl-$N^\delta$-benzyloxy-D-ornithine methyl ester The reaction described in Example 2 (A) was carried out under the same conditions but using $N^\alpha$-t-butyloxycarbonyl-$N^\delta$-tosyl-$N^\delta$-benzyloxy-D-ornithine and $N^\delta$-tosyl-$N^\delta$-benzyloxy-D-ornithine methyl ester hydrochloride in place of $N^\alpha$-t-butyloxycarbonyl-$N^\delta$-tosyl-$N^\delta$-benzyloxy-L-ornithine and $N^\delta$-tosyl-$N^\delta$-benzyloxy-L-ornithine methyl ester hydrochloride, respectively, to obtain $N^\alpha$-t-butyloxy-carbonyl-$N^\delta$-tosyl-$N^\delta$-benzyloxy-D-ornithyl&$N^\delta$-tosyl-$N^\delta$-benzyloxy-D-ornithine methyl having a melting point of 63°–68°C.

Yield: 90.3%, $[\alpha]_D^{24.8}$ −1.4 (c, 1 in ethyl acetate).
Analysis: Calcd. for $C_{44}H_{56}N_4O_{11}S_2$:
C, 59.98; H, 6.41; N, 6.37
Found: C, 60.01; H, 6.69; N, 6.03.

(B). $N^\delta$-tosyl-$N^\delta$-benzyloxy-D-ornithyl-$N^\delta$-tosyl-$N^\delta$-benzyloxy-D-ornithine methyl ester hydrochloride The reaction described in Example 2 (B) was carried out under the same conditions but using $N^\alpha$-t-butyloxy-carbonyl-$N^\delta$-tosyl-$N^\delta$-benzyloxy-D-ornithyl-$N^\delta$-tosyl-$N^\delta$-benzyloxy-D-ornithine methyl ester to obtain $N^\delta$-tosyl-$N^\delta$-benzyloxy-D-ornithyl-$N^\delta$-tosyl-$N^\delta$-benzyloxy-D-ornithine methyl ester hydrochloride having a melting point of 102°–107°C.

Yield: 82.8% $[\alpha]_D^{25}$ −11.4 (c, 1 in methanol).
Analysis: Calcd. for $C_{39}H_{49}N_4O_9S_2$:
C, 57.30; H, 6.04; N, 6.85
Found: C, 57.33; H, 6.08; N, 6.61.

Example 4

(A). Cyclo-di-$N^\delta$-tosyl-$N^\delta$-benzyloxy-L-ornithyl 3.95 g of $N^\delta$-tosyl-$N^\delta$-benzyloxy-L-ornithyl-$N^\delta$-tosyl-$N^\delta$-benzyloxy-L-ornithine methyl ester hydrochloride prepared as in Example 1 (B) was added to 50 ml of methanol previously saturated with anhydrous ammonia at a temperature of 0°C, and the mixture was allowed to stand in a glass vessel for two days at room temperature. The crystals (1.1 g) formed during the standing were filtered, and the filtrate was concentrated to dryness. The resulting crystalline residue was combined with water followed by filtration, and recrystallized from methanol to give cyclo-di-$N^\delta$-tosyl-$N^\delta$-benzyloxy-L-ornithyl.

Yield: 54%.
Melting point, 176°–177°C, $[\alpha]_D^{25.5}$ −31.5° (in dimethyl-formamide).
Analysis: Calcd. for $C_{38}H_{44}N_4O_8S_2$:
C, 60.94; H, 5.92; N, 7.48; S, 8.56
Found: C, 61.15; H, 5.85; N, 7.48; S, 8.59.

(B). Cyclo-di-$N^\delta$-benzyloxy-L-ornithyl Dihydrobromide 1.88 g of cyclo-di-$N^\delta$-tosyl-$N^\delta$-benzyloxy-L-ornithyl prepared as in Example 4 (A) was added to a solution of 5 g of phenol in 20 ml of 36% hydrogen bromide-acetic acid at room temperature. After stirring for 50 hours at room temperature, the mixture was evaporated in vacuo at a temperature of 30°C, and the residual oil substance was crystallized by adding ether. The resulting crystals were filtered and washed successively with ethanol and ether to give the desired product. A portion of the product was recrystallized from ethanol for analysis to give cyclo-di-$N^\delta$-benzyloxy-L- ornithyl hydrobromide having a melting point of 183°–186°C.

Analysis: Calcd. for $C_{24}H_{32}N_4O_4 \cdot 2HBr$:
C, 48.01; H, 5.37; N, 9.33
Found: C, 47.92; H, 5.81; N, 9.10.

The product was identified, by its N.M.R. and I.R. spectra, as a compound having the following structural formula:

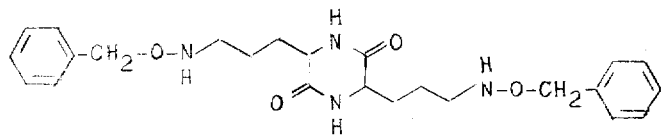

Example 5

Cyclo-di-N⁶-benzyloxy-D-ornithyl Dihydrobromide

Following the procedure described in Example 4 (B) but using cyclo-di-N⁶-tosyl-N⁶-benzyloxy-D-ornithyl in place of cyclo-di-N⁶-tosyl-N⁶-benzyloxy-L-ornithyl, there was obtained cyclo-di-N⁶-benzyloxy-D-ornithyl dihydrobromide having a melting point of 183°–185°C (with decomposition).

Yield: 33.4%
Analysis: Calcd. for $C_{24}H_{32}N_4O_4Br_2$:
C, 48.01; H, 5.37; N, 9.33
Found: C, 47.88; H, 5.64; N, 9.35.

Example 6

(A). Cyclo-di-N⁶-acetyl-N⁶-benzyloxy-L-ornithyl 0.78 g of cyclo-di-N⁶-benzyloxy-L-ornithyl prepared as in Example 4 (B) was mixed with 6.5 ml of pyridine and 6.5 ml of acetic anhydride. The resulting mixture was stirred for 20 hours at room temperature and then evaporated in vacuo. The thus obtained residue was combined with water and the mixture was evaporated (this treatment being repeated twice) to decompose any remaining acetic anhydride present in the mixture in a small amount. The resulting residue was taken into 30 ml of ethyl acetate, and the solution was washed repeatedly with water. The organic layer was dried over sodium sulfate and evaporated in vacuo to dryness. Recrystallization of the thus obtained residue from ethanol-ether yielded cyclo-di-N⁶-acetyl-N⁶-benzyloxy-L-ornithyl having a melting point of 97°–99°C.

Yield: 68%. $[\alpha]_D^{25}$ –16.4 (c, 1 in ethanol).
Analysis: Calcd. for $C_{28}H_{36}N_4O_6$:
C, 64.10; H, 6.92; N, 10.68
Found: C, 63.97; H, 6.86; N, 10.62.

(B). Cyclo-di-N⁶-acetyl-N⁶-hydroxy-L-ornithyl 0.46 g of cyclo-di-N⁶-acetyl-N⁶-benzyloxy-L-ornithyl in 40 ml of ethanol was hydrogenated in the presence of 0.75 g of 5% palladium-on-carbon at room temperature. After 15 minutes, the reaction mixture was filtered to remove the catalyst, and the filtrate was evaporated in vacuo at room temperature. Recrystallization of the residual crystals from boiling water yielding 0.2 g (66% yield) of the product having a melting point of 217°–218.5°C (with decomposition). $[\alpha]_D^{25}$ –28.5 (c, 1 in water). The thus obtained product gave a positive ferric chloride reaction (red-purple color) and was identified as cyclo-di-N⁶-acetyl-N⁶-hydroxy-L-onithyl (rhodotorulic acid) by its N.M.R. and I.R. spectra shown in Table 1 below.

Analysis: Calcd. for $C_{14}H_{24}N_4O_6$:
C, 48.83; H, 7.03; N, 16.27
Found: C, 48.81; H, 7.07; N, 16.18.

Table 1

| N.M.R. and I.R. spectra of product | | | |
|---|---|---|---|
| N.M.R. | | H's | |
| ($F_3CCOOH$) | 7.9 | 8 | Side-chain ethylene |
| | 7.5 | 6 | Acetyl methyl |
| | 6.0 | 4 | Side-chain methylene adjacent to nitrogen |
| | 5.5 | 2 | Ring α-carbon |
| | 1.6 | 2 | Ring amide |
| I.R. | | | |
| (cm⁻¹) | 3180 | | 1400 |
| | 3085 | | 1200 |
| | 2860 | | 1150 |
| | 1690 (amide I) | | 960 |
| | 1560 (hydroxamic acid carbonyl) | | 821 |
| | 1480 | | 792 |
| | 1460 | | 769 |
| | 1445 | | |

Example 7

Cyclo-di-N⁶-acetyl-N⁶-hydroxy-D-ornithyl

Following the procedure described in Example 6 (B) under the same conditions, but using cyclo-di-N⁶-acetyl-N⁶-benzyloxy-D-ornithyl in place of cyclo-di-N⁶-acetyl-N⁶-benzyloxy-L-ornithyl, there was obtained cyclo-di-N⁶-acetyl-N⁶-hydroxy-D-ornithyl having a melting point of 216–218.5.

Yield: 38.8%. $[\alpha]_D^{24}$ +28.0 (C, 0.6 in water).
Analysis: Calcd. for $C_{14}H_{24}N_4O_6$:
C, 48.83; H, 7.03; N, 16.27
Found: C, 48.72; H, 6.88; N, 16.05.

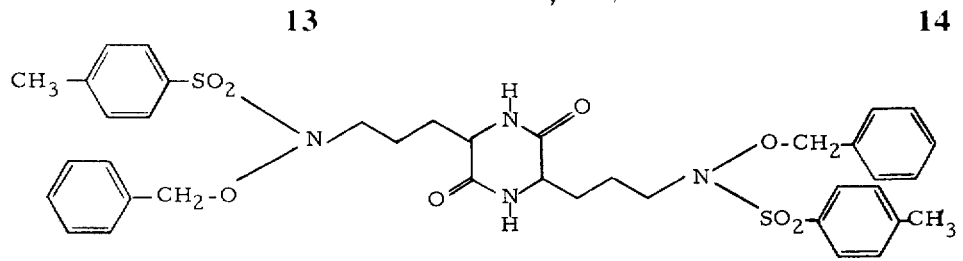

What we claim is:

1. A process for the production of cyclo-di-N⁶-alkanoyl-N⁶-hydroxy-ornithyl having the formula:

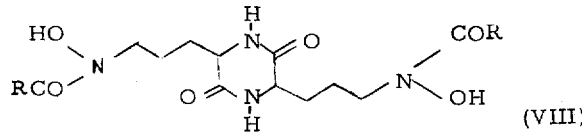

wherein R represents a lower alkyl group having 1 to 4 carbon atoms, inclusive, which comprises the step of catalytically reducing an alkanoyl compound of the formula

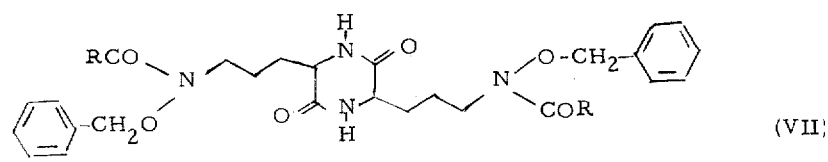

herein R is as defined above by hydrogenation in the presence of palladium-on-carbon at room temperature.

2. A process for the production of cyclo-di-N[α] -canoyl-N[δ] -hydroxy-ornithyl having the formula

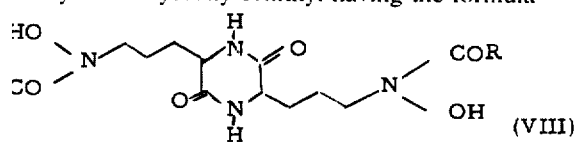

wherein R represents a lower alkyl group having 1 to 4 carbon atoms, inclusive, which comprises the steps of treating a compound of the formula

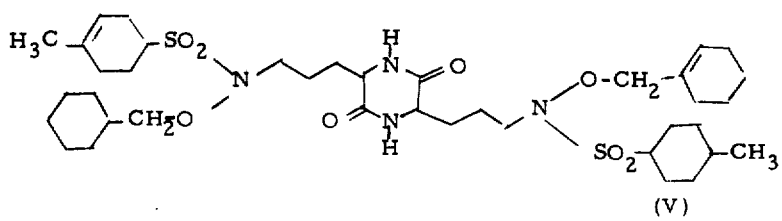

in a solvent system consisting of hydrogen bromide, acetic acid and phenol wherein 30 to 40 percent by weight hydrogen bromide is in solution in the acetic acid and phenol is present in 0.1–0.3 parts by weight/1 part by weight acetic acid at 18°C to 25°C for at least thirty hours to produce a compound of the formula (VI),

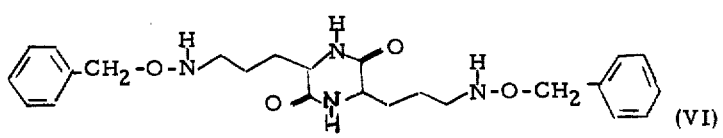

then acylating the compound of the formula (VI) with an acid anhydride in quinoline or pyridine to produce a compound of the formula (VII)

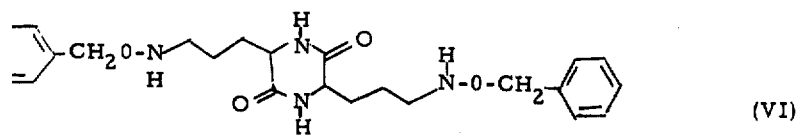

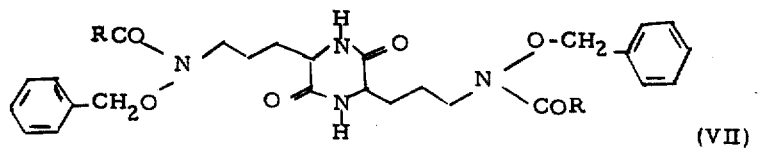

with an acid anhydride in quinoline or pyridine to produce a compound of the formula

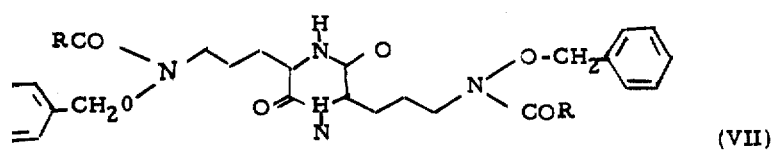

and then catalytically reducing the compound of the formula (VII) by hydrogenation in the presence of palladium-on-carbon at room temperature.

3. A process for the production of cyclo-di-N[α] -canoyl-N[δ] -hydroxy-ornithyl having the formula

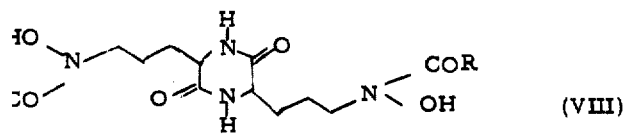

wherein R represents a lower alkyl group having 1 to the formula and then catalytically reducing the compound of the formula (VII) by hydrogenation in the presence of palladium-on-carbon at room temperature.

4. The process of claim 1 wherein R is methyl.
5. The process of claim 2 wherein R is methyl.
6. The process of claim 3 wherein R is methyl.
7. Cyclo-di-N[α] -tosyl-N[δ] -benzyloxy-ornithyl of